US009797725B2

(12) United States Patent
Finlow-Bates

(10) Patent No.: US 9,797,725 B2
(45) Date of Patent: Oct. 24, 2017

(54) APPARATUS AND METHOD TO AID MAGNETIC POSITIONING AND NAVIGATION

(71) Applicant: Keir Finlow-Bates, Kangasala (FI)

(72) Inventor: Keir Finlow-Bates, Kangasala (FI)

( * ) Notice: Subject to any disclaimer, the term of this patent is extended or adjusted under 35 U.S.C. 154(b) by 20 days.

(21) Appl. No.: 15/042,165

(22) Filed: Feb. 12, 2016

(65) Prior Publication Data
US 2017/0234685 A1    Aug. 17, 2017

(51) Int. Cl.
*G01C 21/08* (2006.01)
*G01C 21/20* (2006.01)

(52) U.S. Cl.
CPC ........... *G01C 21/08* (2013.01); *G01C 21/206* (2013.01)

(58) Field of Classification Search
CPC ............................... G01C 21/08; G01C 21/206
USPC .......................................................... 701/450
See application file for complete search history.

(56) References Cited

U.S. PATENT DOCUMENTS

| | | | | |
|---|---|---|---|---|
| 8,296,058 B2 * | 10/2012 | Koskan | ................ | G01C 21/165 340/995.25 |
| 8,527,199 B1 * | 9/2013 | Burnette | ................ | G01C 21/32 701/23 |
| 8,798,924 B2 | 8/2014 | Haverinen | | |
| 9,078,104 B2 | 7/2015 | Haverinen | | |
| 9,151,621 B2 | 10/2015 | Haverinen | | |
| 9,170,112 B2 * | 10/2015 | Mirov | ..................... | G01C 21/08 |
| 2012/0173174 A1 * | 7/2012 | Gaarder | ............... | G01R 31/086 702/58 |
| 2013/0201316 A1 * | 8/2013 | Binder | .................... | H04L 67/12 348/77 |
| 2014/0180627 A1 * | 6/2014 | Naguib | .................. | G01C 17/38 702/150 |
| 2014/0229103 A1 * | 8/2014 | Mirov | ..................... | G01C 21/08 701/525 |
| 2016/0084659 A1 * | 3/2016 | Yang | ..................... | G01C 21/206 702/150 |
| 2016/0258758 A1 * | 9/2016 | Houston | ................ | G01C 21/20 |
| 2016/0341569 A1 * | 11/2016 | Won | ....................... | G01C 21/08 |

* cited by examiner

*Primary Examiner* — Atul Trivedi

(57) ABSTRACT

An apparatus and method for altering the nature of a magnetic field at a location is presented, consisting of a placement of one or more static magnets, electromagnets or other magnetic field altering apparatus at strategic positions, in order to ensure that no two paths through the location present the same fluctuations and patterns in magnetic field intensity and heading. In a further embodiment a magnetic field in a location is modulated in a predetermined manner through the use of one or more electromagnets supplied with an equivalent modulated current or voltage. This prevents identical magnetic field patterns and provides a magnetic field measuring device with the possibility of determining an approximate location while stationary, and detecting whether materials capable of altering the magnetic field of the location have been added or removed from the location since magnetic mapping was conducted.

5 Claims, 5 Drawing Sheets

APPARATUS AND METHOD TO AID MAGNETIC POSITIONING AND NAVIGATION

TECHNICAL FIELD

The invention relates to indoor navigation and positioning through the use of variations in a magnetic field of a location, and more specifically to an alteration of the magnetic field through a use of fixed magnets, electromagnets, and other magnetic field altering apparatus.

BACKGROUND OF THE INVENTION

Indoor navigation in a location presents a problem compared to outdoor navigation, in that satellite signals used in calculating a position within the location, through the use of a global navigation satellite system, are significantly attenuated by the structure of the building. A method for enabling indoor navigation using variations in the magnetic field of the location is known from U.S. Pat. Nos. 8,798,924 and 9,078,104.

However, the method for enabling indoor navigation using variations in the magnetic field of the location, due to ferromagnetic influences causing variations in the native Earth's magnetic field (EMF), suffers from a number of shortcomings.

Firstly, two or more paths through the area that has been magnetically mapped may produce the same or very similar variations in the magnetic field vectors along the path, in which case the navigation system will be unable to reliably determine which path has been followed, and as a result an actual position and a path traversed cannot be established.

Secondly, in large empty open areas such as aircraft hangers or factory floors there may not be enough ferromagnetic materials in the vicinity of the paths to produce measurable differences between the magnetic fields along the paths.

Thirdly, with current magnetic field based navigation methods the magnetic field measuring device must move through the location's field in order to establish a pattern of magnetic field changes to determine position, and the method is therefore of no use in determining a position when the magnetic field measuring device is stationary, Finally, area to be navigated may experience irregular changes in the alterations to the magnetic field due to the addition or removal of ferromagnetic materials, for example in an underground garage or aircraft hanger, where vehicles may be parked and then removed at unpredictable intervals.

It is the intention of the present invention to address the shortcomings of the prior art, i.e. the problems of determining an indoor position using fluctuations in the magnetic field strength and direction over an area, in a location where no significant magnetic field fluctuations may be detected, where multiple locations within the area to be navigated present the same alterations in magnetic field strengths, where the magnetic field measuring device is stationary, or where noticeable changes to the magnetic field strength occur at unknown intervals.

SUMMARY OF THE INVENTION

Embodiments of the invention are based on the observation that the magnetic field of a location may be altered by a strategic placement of one or more magnetic materials within the location, hence providing a solution for navigating in the location using a navigation device that measures variations in a magnetic field strength and direction within the location, where a set of paths through the location present a same or similar pattern of variations in the magnetic field strength and direction, thereby making it difficult or impossible to determine which one of the paths the navigation device is on.

An apparatus and method is presented for enhancing navigation using fluctuations in a magnetic field comprising: measuring and mapping the magnetic field of a location, determining where there are a plurality of paths within the location that present a similar or identical set of changes in the magnetic field when traversed, and placing a one or more magnetized materials within the location to alter the nature of the magnetic field, in order to ensure that the plurality of paths present a different set of changes in the magnetic field when traversed, and producing and storing on a database server an updated mapping of the magnetic field of the location. This increases the speed with which a solution for a current position and path may be converged on by a magnetic field navigation system.

In one embodiment of the invention, the one or more magnetized materials may comprise a one or more permanent magnets, including but not limited to: iron or iron alloy magnets, neodymium magnets, samarium-cobalt magnets, or rare-earth magnets.

In another embodiment of the invention, the one or more magnetized materials may comprise a one or more electromagnets, powered by a one or more batteries, generators, solar panels, or by a wired connection to mains electricity.

In another embodiment of the invention, the one or more magnetized materials may comprise a one or more electromagnets powered by a power supply supplying one or more of a variable voltage and a variable current to each of the one or more electromagnets. A rate of variation in the variable voltage and the variable current is stored on the database server, along with an associated location of each electromagnet, for retrieval by a navigation device measuring variations in the magnetic field of the location. This permits the navigation device to detect the fluctuations in the magnetic field over time, even when stationary, and by querying the database server for the location of the electromagnet to determine its approximate position.

In a further embodiment of the invention, a different waveform is generated by each of the electromagnets, is synchronized to a time and periodicity, and the time and periodicity are stored on the database server together with the locations of the one or more electromagnets, for retrieval by the navigation device measuring variations in the magnetic field of the location. This permits the navigation device to distinguish between different electromagnets in different locations by detecting what frequency and amplitude of magnetic field changes are occurring at the navigation device's position, even when stationary, and by querying the database server to determine its approximate location.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present invention.

For simplicity, in the figures contours are used to indicate points of identical magnetic field strength, and direction is not indicated. Those skilled in the art will be aware that a magnetic field is a vector field, presenting both a magnetic field strength (commonly measured in amperes per meter, or in teslas), and a direction. However, two-dimensional diagrams are not conducive to representing a vector field, and the directional nature of the field may be inferred from the diagrams and the accompanying descriptions.

In the figures, like reference numerals designate corresponding parts throughout the different views.

FIG. 1A illustrates a magnetic field within a location, and presents two paths through the location that produce the same variations in magnetic field along the paths.

FIG. 1B is a graph plotting magnetic field intensity against distance along the two paths presented in FIG. 1A.

FIG. 2A illustrates the magnetic field within the same location presented in FIG. 1A. However, a magnetic material has been placed at a strategically determined position to alter the nature of the magnetic field within the location, in accordance with an embodiment of the present invention.

FIG. 2B is a graph plotting magnetic field intensity along the two paths in FIG. 2A.

FIG. 3A illustrates the magnetic field present in an area, such as a factory floor, underground garage or aircraft hanger, in which no structures are available to alter the native EMF of the location, and presents two paths through the location.

FIG. 3B illustrates the magnetic field in the same area presented in FIG. 3A, however, three magnetic materials have been placed at strategic positions to alter the nature of the magnetic field, in accordance with an embodiment of the present invention.

FIG. 4 illustrates an electromagnet powered by a variable power supply that is controlled by a signal generator.

FIG. 5A shows a location with the apparatus introduced in FIG. 4 present and activated, and a stationary magnetic field measuring device.

FIG. 5B is a graph plotting the magnetic field intensity as measured by the magnetic field measuring device in FIG. 5A.

DETAILED DESCRIPTION OF THE INVENTION

As described in the Background of the Invention, a problem exists with navigating in a location using a method of comparing measured variations in the strength and direction of a magnetic field along paths in the location with previously mapped field strengths and directions, namely that two or more paths within the location may produce the same or very similar variations in the magnetic field, making it difficult or even impossible to determine which path is being followed by a magnetic field measuring device.

Figure 1A:
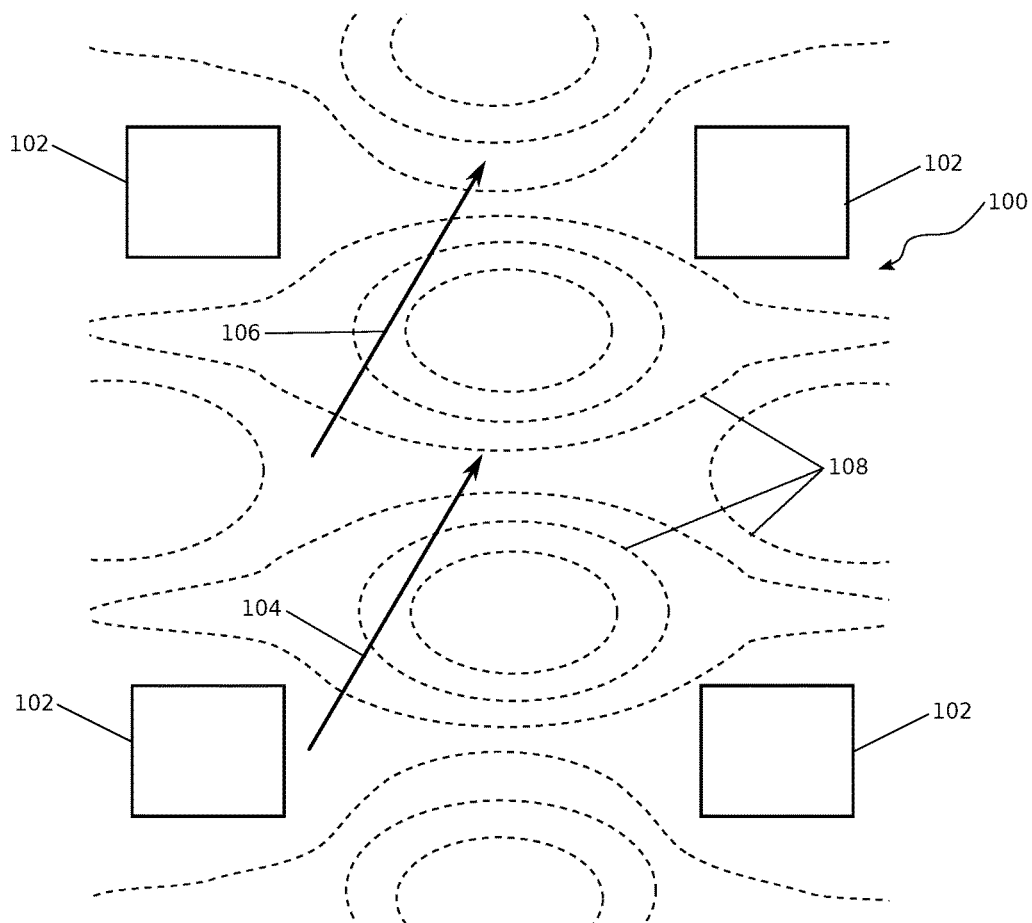

FIG. 1A presents a visualization of the problem. In a location 100 a plurality of structures 102 influence the magnetic field, indicated by a plurality of contours of equal magnetic strength 108, present in the location. A first potential path through the location 104 is indicated, together with a second potential path 106.

Figure 1B:
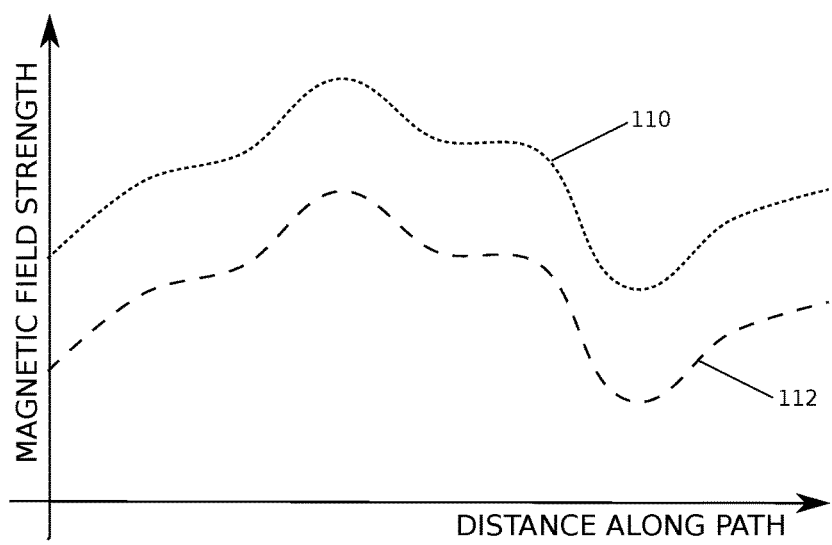

In FIG. 1B a graph of magnetic field strength is shown plotted against a distance traveled along a path. A first trace 110 shows the relation between magnetic field strength and distance along path 104, and a second trace 112 shows the relation between magnetic field strength and distance along path 106. As may be observed, although the two traces have different magnitudes at given points, they have very similar or even identical shapes. Due to calibration differences between different magnetic field measuring devices, it is not possible to distinguish whether a magnetic field measuring device has traversed path 104 or 106 from the variations in magnetic field strength along the path alone.

Similarly, two paths may exhibit very similar or even identical changes in magnetic field direction as the paths are traversed, and as previously discussed in paragraph 0017, those skilled in the art may infer the equivalent appropriate behavior and implementation of an embodiment of the invention from the magnetic field strength case as presented, by replacing all references to magnetic field strength with magnetic field direction.

Figure 2A:
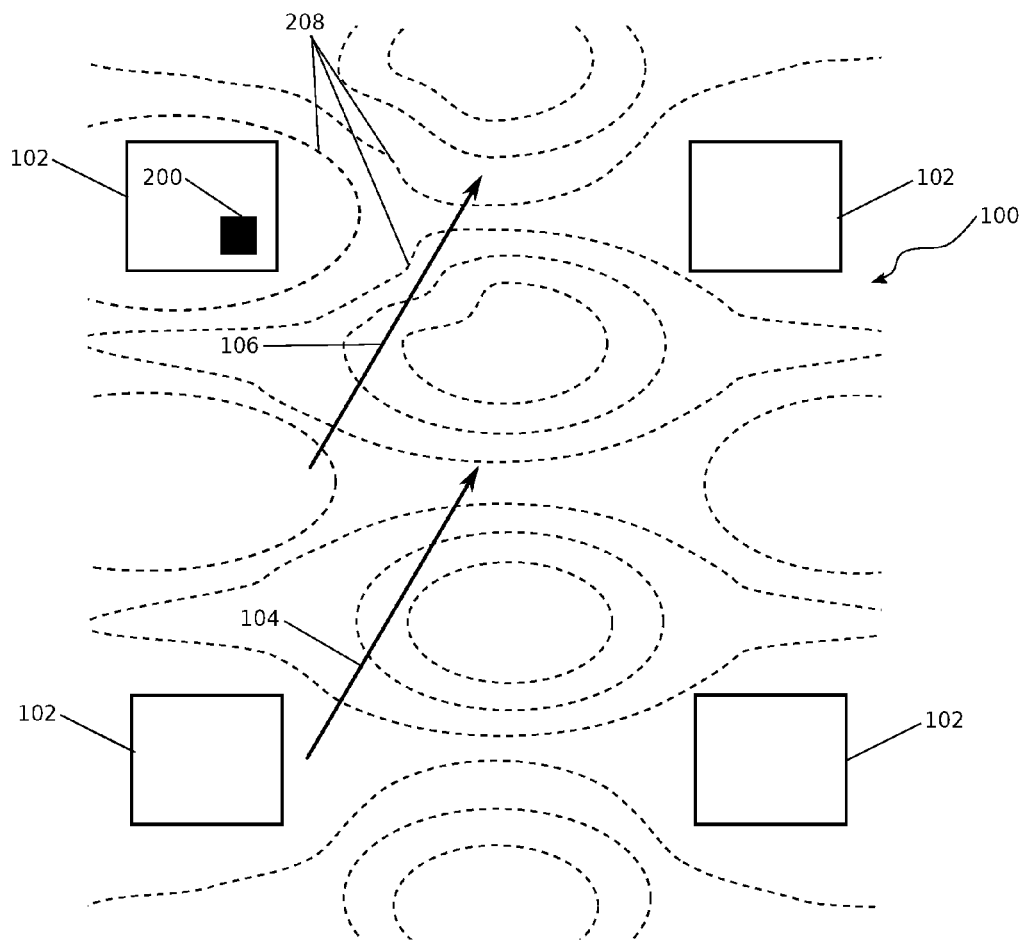

In one embodiment of the invention, illustrated in FIG. 2A, after measuring magnetic field strengths within location 100 and determining paths with identical variations in magnetic field strengths along the paths, a magnetic material 200 is placed on top or within a structure 102, thereby altering the previously measured magnetic field strength within the vicinity of the magnetic material 200. As a result the paths 104 and 106, which as illustrated in FIG. 1A and FIG. 1B previously exhibited the same variations in magnetic field strength along the path, now pass through a new magnetic field of differing variations in magnetic intensity, as marked by magnetic field strength contours 208.

Figure 2B:
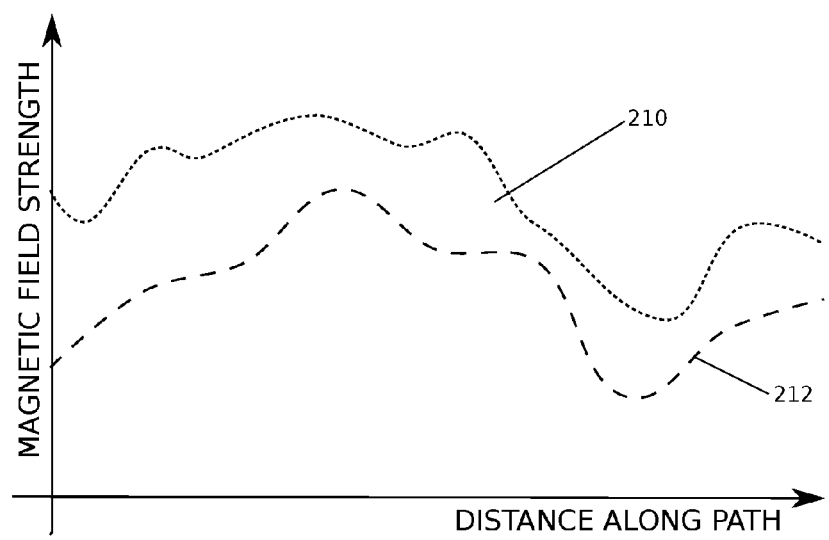

This is further clarified in FIG. 2B, in which an updated graph of magnetic field strength is shown plotted against a distance traveled along a path. A first trace 212 now shows the relation between magnetic field strength and distance along path 104, and a second trace 210 shows the relation between magnetic field strength and distance along path 106 after the magnetic material 200 has been strategically placed in the location. As may be seen, the two traces now have significantly different shapes, and a magnetic field navigation system may now easily distinguish whether the magnetic field measuring device traversed path 104 or path 106.

Figure 3A:
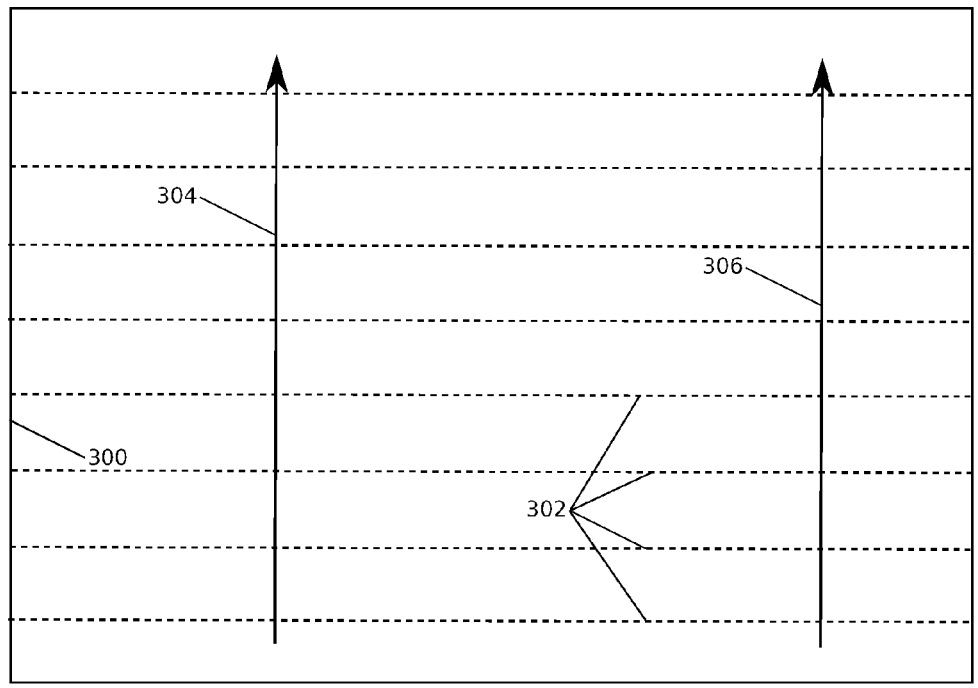

FIG. 3A presents a situation in which a location 300 has been surveyed for its magnetic field, as indicated by magnetic field intensity contours 302, and shows no significant variations in magnetic field intensity. Location 300 could, for example, comprise a large empty warehouse or aircraft hanger. Any two parallel equal length paths, for example path 304 and path 306, show the same variation in magnetic intensity when traversed. Therefore a magnetic field based navigation system would not be able to determine which of the paths 304 and 306 was traversed from the readings obtained from a magnetic field measuring device.

Figure 3B:
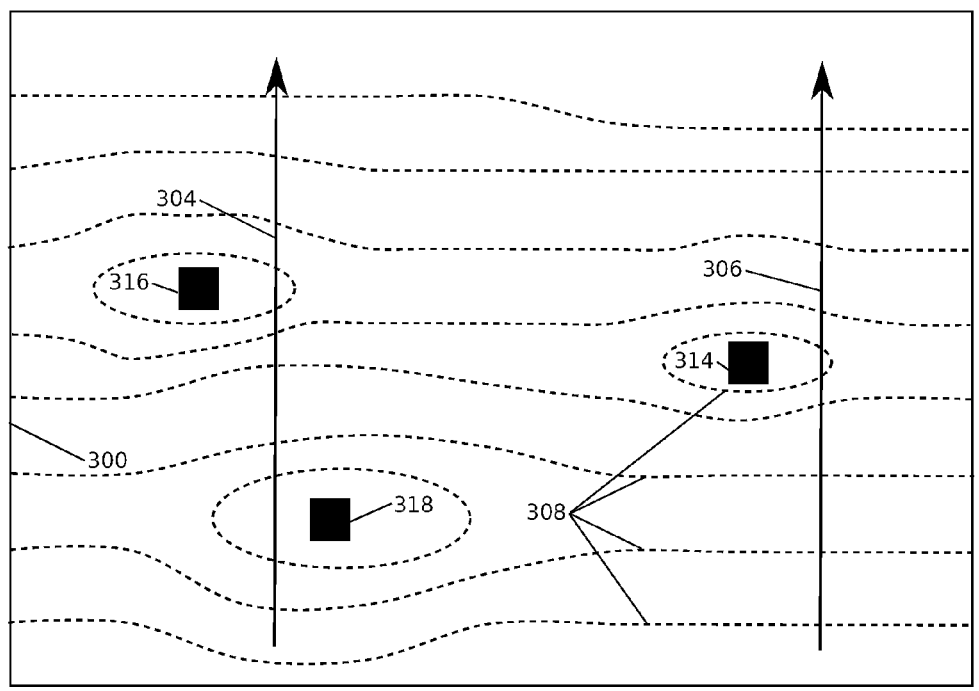

FIG. 3B presents the same location 300, in which a plurality of magnetic materials (314, 316 and 318) have been placed after reviewing the magnetic field present in the location, altering the native structure of the location's magnetic field. The contours representing the new magnetic field 308 now show significant variation across the location 300. As a result the readings obtained by a magnetic field measuring device traversing path 304 differ significantly from those obtained by traversing path 306, and a magnetic field based navigation system may easily determine which of the paths is traversed.

The magnetic materials placed in the location may comprise one or more of, or a combination of: permanent magnets, electromagnets powered by a battery or a fixed power supply, or electromagnets each powered by a variable power supply controlled by a signal generator. The signal generator used may be: a standard sine-wave generator, a function generator, an arbitrary waveform generator, or another means of generating a signal.

Figure 4:
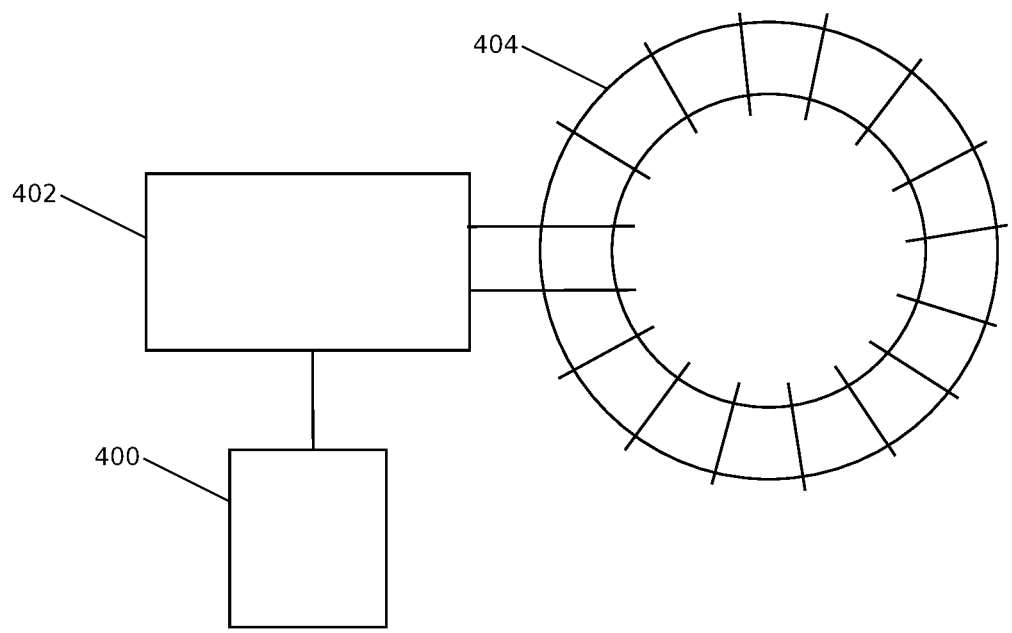

FIG. 4 is a diagram defining one exemplary embodiment of an electromagnet 404 powered by a variable power supply 402 that is controlled by an arbitrary waveform generator 400. In a preferred embodiment of the invention, a distinct waveform generated by the arbitrary waveform generator controls the voltage and current supplied to the electromagnet by the variable power supply, resulting in an equivalent fluctuation in the intensity and direction of the magnetic field in the vicinity of the electromagnet.

Figure 5A:
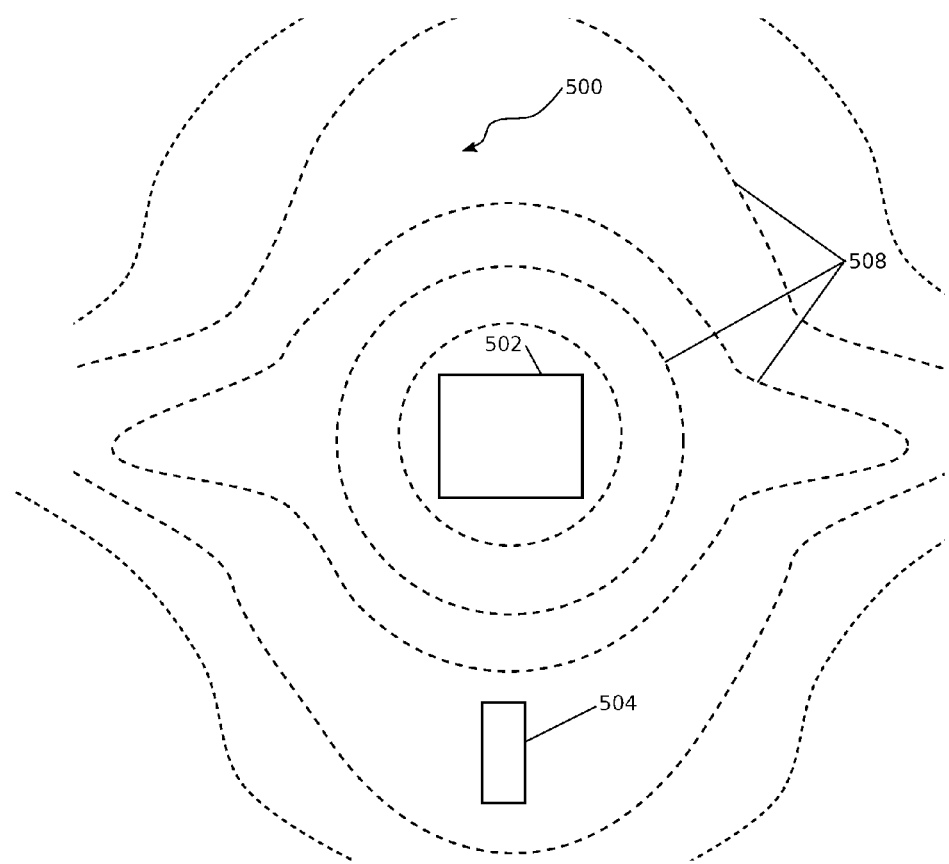

FIG. 5A shows the electromagnetic apparatus 502 of FIG. 4 placed in a location 500, and producing a distinct waveform pattern in the magnetic field of the location as marked by contours of equivalent magnetic field strength 508. The distinct waveform pattern may be stored on a database server together with the location of the electromagnet. A network connected navigation device with a magnetic field detecting component 504 may then measure the fluctuations in the magnetic field produced by the electromagnetic apparatus if it is in the vicinity of the electromagnet.

Figure 5B:
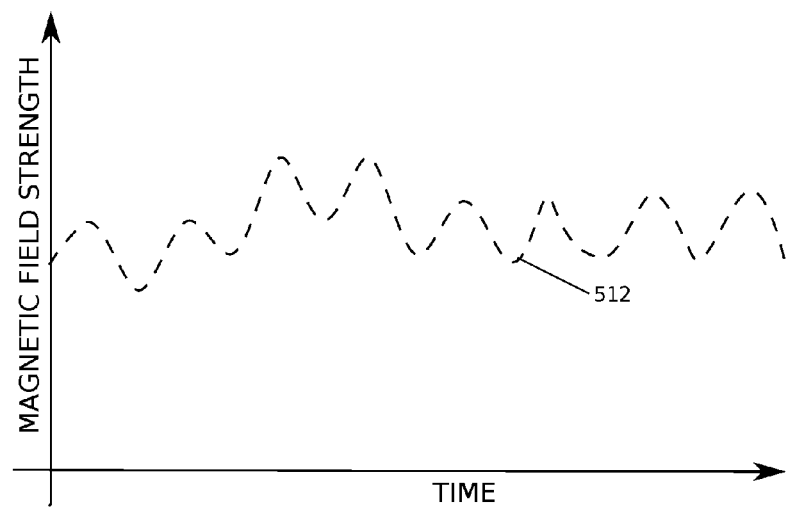

FIG. 5B shows a graph plotting magnetic field strength against time at the location of the network connected navigation device with a magnetic field detecting component. The trace 512 shows the fluctuations in the magnetic field over time, which form a distinct pattern. The network connected navigation device may then extract the waveform pattern, and query the database server over the network in order to obtain the location of the electromagnet producing the waveform pattern. By this method and apparatus the network connected navigation device may determine its approximate location, even when stationary.

The method also allows the network connected navigation device to determine its approximate location if an underlying intrinsic magnetic field of the location has changed due to the addition of ferromagnetic materials, such as additional parked cars in an underground garage, or aircraft in an aircraft hanger. Although the underlying intrinsic magnetic field may have changed, dynamic variations in the magnetic field induced by the electromagnetic apparatus 502 may still be detected and extracted from the underlying intrinsic magnetic field. They may subsequently be compared with the waveform patterns stored on the database server, in order to determine which apparatus is in the vicinity of the network connected navigation device. As the position of the apparatus is also stored in association with the waveform pattern, an approximate position of the network connected navigation device is determined.

Embodiments as described may also be implemented in a navigation device with a magnetic field detecting component, that does not have a network connection. In one of these embodiments the navigation device with a magnetic field detecting component may be pre-loaded with a list of a plurality of electromagnetic apparatus locations and an associated plurality of waveform patterns, thereby allowing the navigation device with a magnetic field detecting component to determine its approximate position within the location even without a network connection or access to the database server.

What is claimed is:

1. An apparatus and method for enhancing navigation using fluctuations in a magnetic field of a location comprising:

measuring and mapping the magnetic field of the location; and determining where there are a plurality of paths within the location that present a similar or identical set of changes in the magnetic field when traversed; and placing one or more magnetized materials within the location to alter the nature of the magnetic field, in order to ensure that the plurality of paths present a different set of changes in the magnetic field when traversed; and producing and storing on a database server an updated mapping of the magnetic field of the location for retrieval by a navigation device measuring variations in the magnetic field of the location while or after the navigation device traverses a path within the location.

2. The apparatus and method of claim 1, wherein the one or more magnetized materials comprise one or more permanent magnets.

3. The apparatus and method of claim 1, wherein the one or more magnetized materials comprise one or more electromagnets.

4. The apparatus and method of claim 3, wherein furthermore the one or more electromagnets are powered by a variable power supply capable of generating a waveform of varying current or voltage or both, in order to produce a fluctuating magnetic field on top of the magnetic field ordinarily present in the location; where the waveform encodes a distinct and recognizable pattern; and the distinct and recognizable pattern is stored on the database server together with a location of the one or more electromagnets for retrieval by the navigation device measuring variations in the magnetic field of the location.

5. The apparatus and method of claim 4, wherein the variable power supply generates the waveform synchronized to a time and periodicity; and the time and periodicity are stored on the database server together with the locations of the one or more electromagnets, for retrieval by the navigation device measuring variations in the magnetic field of the location.

* * * * *